United States Patent
Miller et al.

(10) Patent No.: US 10,839,030 B2
(45) Date of Patent: Nov. 17, 2020

(54) PERSISTENT FILTER CONTENT REFINEMENT SYSTEM

(71) Applicant: INTERNATIONAL BUSINESS MACHINES CORPORATION, Armonk, NY (US)

(72) Inventors: Mary E. Miller, Austin, TX (US); Ethan L. Perry, Lexington, MA (US); Erika Varga, Harvard, MA (US)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 15/271,247

(22) Filed: Sep. 21, 2016

(65) Prior Publication Data
US 2018/0081974 A1 Mar. 22, 2018

(51) Int. Cl.
*G06F 16/00* (2019.01)
*G06F 16/9535* (2019.01)
*G06F 16/335* (2019.01)

(52) U.S. Cl.
CPC ........ *G06F 16/9535* (2019.01); *G06F 16/335* (2019.01)

(58) Field of Classification Search
CPC ............ G06F 17/30029; G06F 16/951; G06F 16/285; G06F 16/284; G06F 16/5846; G06F 16/9535; G06F 16/335
USPC .................................................. 707/722, 769
See application file for complete search history.

(56) References Cited

U.S. PATENT DOCUMENTS

| | | | |
|---|---|---|---|
| 7,293,017 B2 * | 11/2007 | Hurst-Hiller | ....... G06F 16/9535 707/740 |
| 7,315,893 B2 | 1/2008 | Vinberg | |
| 7,844,592 B2 | 11/2010 | Shoval et al. | |
| 8,458,211 B2 * | 6/2013 | Ahn | ................... G06F 17/30029 707/769 |
| 9,015,130 B1 * | 4/2015 | Michaelis | .............. G06Q 10/00 707/689 |
| 9,110,953 B2 | 8/2015 | Steinberg et al. | |
| 9,298,816 B2 * | 3/2016 | Dimassimo | ........... G06F 16/316 |
| 9,323,835 B2 * | 4/2016 | Vuksan | ............... G06F 16/9535 |
| 10,210,453 B2 * | 2/2019 | Krishnamurthy | ...... G06N 5/022 |

(Continued)

OTHER PUBLICATIONS

Anonymous, "System and Method for Dynamic Survey Generation Based on Social Media Analysis", Jul. 27, 2012, An IP.com Prior Art Database Technical Disclosure, pp. 1-14, http://ip.com/IPCOM/000220253D.

Anonymous, "Automatic Identification of filters to forward mail from existing mail contents", Feb. 12, 2013, An IP.com Prior Art Database Technical Disclosure, pp. 1-8, http://ip.com/IPCOM/000225349D.

IBM, "System and Method to Improve Enterprise Content Discovery and Management based on Relationships", May 15, 2009, An IP.com Prior Art Database Technical Disclosure, pp. 1-4, http://ip.com/IPCOM/000183115D.

(Continued)

*Primary Examiner* — Jean M Corrielus
(74) *Attorney, Agent, or Firm* — Dmitry Paskalov

(57) ABSTRACT

A computer determines a filtering query based on a persistent list of items, wherein the persistent list of items comprises a list of natural language elements, and wherein the filtering query is computer instructions corresponding to the natural language elements. The computer determines whether a server is capable of receiving the filtering query. Based on determining that the server is capable of receiving the filtering query, the computer transmits the filtering query to the server. The computer receives filtered content from the server, wherein the filtered content is based on the filtering query, and the computer displays the filtered content.

20 Claims, 3 Drawing Sheets

(56) References Cited

U.S. PATENT DOCUMENTS

| | | | | |
|---|---|---|---|---|
| 2003/0023624 | A1* | 1/2003 | Hamilton, II | G06F 16/9535 715/234 |
| 2009/0063452 | A1* | 3/2009 | Ahn | G06F 17/30029 |
| 2009/0083251 | A1* | 3/2009 | Sahasrabudhe | G06Q 40/06 |
| 2012/0005197 | A1* | 1/2012 | Ahn | G06F 17/30029 707/722 |
| 2012/0011111 | A1* | 1/2012 | Ahn | G06F 21/6227 707/722 |
| 2012/0278179 | A1* | 11/2012 | Campbell | G06Q 30/0255 705/14.69 |
| 2012/0278330 | A1* | 11/2012 | Campbell | G06F 16/48 707/740 |
| 2012/0278331 | A1* | 11/2012 | Campbell | G06F 16/437 707/740 |
| 2014/0280095 | A1 | 9/2014 | Friedman et al. | |
| 2015/0269609 | A1* | 9/2015 | Mehanian | G06Q 30/0246 705/14.45 |
| 2016/0048556 | A1* | 2/2016 | Kelly | G06F 16/9535 707/767 |
| 2017/0053208 | A1* | 2/2017 | Krishnamurthy | G06N 5/022 |

OTHER PUBLICATIONS

Raghuveer et al., "Method and System for Recommending Segments to Target Advertisement based on Devices and Advertisers", Jan. 14, 2015, An IP.com Prior Art Database Technical Disclosure, pp. 1-11, http://ip.com/IPCOM/000240228D.

Fishkin et al., "Enhanced Dynamic Queries via Movable Filters", CHI '95 Proceedings of the SIGCHI Conference on Human Factors in Computing Systems, May 7-11, 1995, Denver, Colorado, pp. 1-11, Printed on Apr. 29, 2016, http://www.sigchi.org/chi95/proceedings/papers/kpf_bdy.htm.

Dumais et al., "Stuff I've Seen: A System for Personal Information Retrieval and Re-Use", SIGIR '03, Jul. 28-Aug. 1, 2003, Toronto, Canada, pp. 1-8, Conference Paper Available: Jan. 2003, Copyright 2003 ACM 1-58113-646-3/03/0007, http://research.microsoft.com:8082/en-us/um/people/sdumais/SISCore-SIGIR2003-Final.pdf.

IBM, "IBM Connect 2016-GS part 2," YouTube.com, IBM Events, https://www.youtube.com/watch?v=GIJAqdQAbag, Uploaded on Feb. 2, 2016, Printed on Sep. 15, 2016, pp. 1-4, Grace Period Disclosure.

* cited by examiner

PERSISTENT FILTER CONTENT REFINEMENT SYSTEM

Aspects of the present invention have been disclosed by another, who obtained the subject matter disclosed directly from the inventors, made available to the public. The disclosure occurred during an IBM Connect Conference that was held on Jan. 31, 2016 until Feb. 3, 2016. The following disclosure is submitted under 35 U.S.C. § 102(b)(1)(A).

BACKGROUND

The present invention relates generally to a field of content organization in a computer system, and more particularly to refining content of a data stream received by a user device. Typically, refining the content of the data stream can be performed by applying a filter to the received content.

Content, as a part of a data stream, is typically managed by computers in an internet environment, such as a social networking environment. Content refinement can be performed on data streams by removing repeating or unwanted content prior to presenting the content to a user. Content filtering can be performed using semantic or lexical analysis. For example, semantic analysis can involve removing repeating structures or entries having the same meaning. Content filtering is used to filter content, such as restricting display of spam emails to a user. For example, specific words and/or phrases associated with spam emails can be identified, then emails containing those identified words and/or phrases (i.e., spam emails) are not displayed to a user.

SUMMARY

Embodiments of the present invention provide a system, method, and program product for a persistent filter content refinement program. A computer determines a filtering query based on a persistent list of items, wherein the persistent list of items comprises a list of natural language elements, and wherein the filtering query is computer instructions corresponding to the natural language elements. The computer determines whether a server is capable of receiving the filtering query. Based on determining that the server is capable of receiving the filtering query, the computer transmits the filtering query to the server. The computer receives filtered content from the server, wherein the filtered content is based on the filtering query, and the computer displays the filtered content.

DETAILED DESCRIPTION

A data stream is information that is received from the web and presented to a user on a display of a computer or user device, upon user request. A data stream (e.g. social media feeds, newsfeeds, weather updates, emails, or any other feeds of information coming from the web) is managed by web services, or content providing services, to provide desirable content to users of the web services. Typically, a user is presented with content on a computer system, or a user device, such that the content is transmitted from the web services to the user device over the network.

In certain instances, the content presented to the user can include relevant and irrelevant content, and the user is required to differentiate what is important content. Typically, not all of the presented content is relevant to the user and often the content that is important to the user can be difficult to locate in instances where a large amount of content is presented to the user. Accordingly, a persistent filter can be implemented to address the problem of refining, filtering, organizing, and displaying important content to the user from the data stream.

A persistent filter is a list of items that are natural language elements used to prioritize, organize, and filter the content. The natural language elements are any verbal elements that can be associated with computer related information such as email addresses, names, user names, IP addresses, group names, topics. A persistent filter, such as a list, can be updated by adding items from the user usage history data accumulated by programs or services, or user profile that includes user preferences and user manual inputs to maintain the items of the persistent list in order to provide important content that the user prefers.

Persistent filter includes items such as names, email addresses, groups, topics, specific words or phrases, or other identifiers that the user defines as important and prefers to be displayed in a user preferred order on the user device. Once initially generated, the persistent list can be stored in the memory and used to filter any data stream presented to the user.

Figure 1:
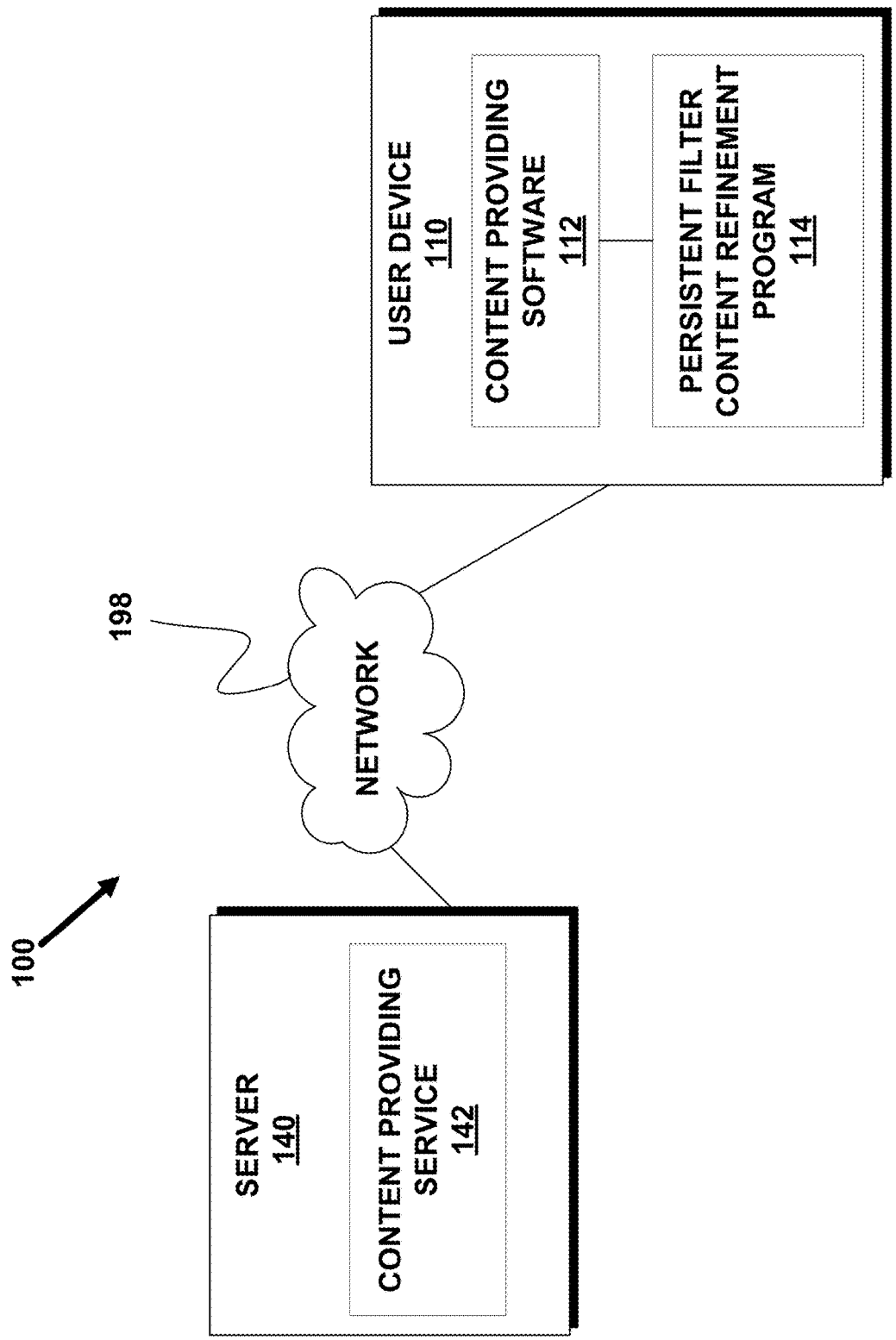
FIG. 1 illustrates a Persistent Filter Content Refinement system, in accordance with an embodiment of the invention.

FIG. 1 illustrates a Persistent Filter Content Refinement (PFCR) system 100 that determines, organizes and filters the content, in accordance with an embodiment of the invention. In an example embodiment, PFCR system 100 comprises a user device 110 (running content providing software 112 and PFCR program 114), and server 140 (running content providing service 142) interconnected via network 198.

In accordance with an embodiment of the invention, network 198 is the Internet, representing a worldwide collection of networks and gateways to support communications between devices connected to the Internet. Accordingly, network 198 can include, for example, wired, wireless or fiber optic connections. In other embodiments, network 198 can be implemented as an intranet, a local area network (LAN), or a wide area network (WAN). In general, network 198 can be any combination of connections and protocols that will support communications between server 140 and user device 110.

According to an example embodiment, server 140 represents a platform configured to send and receive content from user device 110 over network 198. For example, server 140 can be a web server, file server, desktop computer, or any other electronic device or computing system capable of exchanging content over network 198. Although not shown, optionally, server 140 can comprise a cluster of servers. In an example embodiment, server 140 is a computing system that is optimized for the support of multiple network requests related to accessing, searching, sending, and receiving content. In this embodiment, server 140 includes content providing service 142 that provides content to user device 110.

A content providing service 142 operates on server 140, and represents a software program configured to provide content by allowing access, searches, and updates to a content managed by content providing service 142. According to the example embodiment, the content can be stored on server 140 or other servers as one or more databases, allowing content providing software 112 to access, search, and update the content. For example, content providing service 142 can be a social media service providing content such as, for example, newsfeeds, comments, chats, documents, and other multimedia content. In other embodiments, content providing service 142 can provide other feed generated content to user device 110, such as shipping information, tracking information, real-time events, statuses, and other data streams.

According to example embodiment, user device 110 represents a platform configured to determine and send user requests, receive and process the content corresponding to the user requests, and display the content to the user. For example, user device 110 can be a desktop computer, a notebook, a laptop computer, a tablet computer, a handheld device, a smart-phone, a thin client, or any other electronic device or computing system capable of receiving and sending content to and from other computing devices, such as server 140, via network 198. In an example embodiment, user device 110 can determine user request (input) and display the content by executing content providing software 112 and PFCR program 114.

Content providing software 112 is a program capable of receiving, sending, organizing, and displaying content received from content providing service 142 on user device 110. According to an example embodiment, content providing software 112 receives the content from content providing service 142 by sending requests for content such as queries, or user authentication parameters or both. In another embodiment, content providing software 112 can be located on server 140 or another server connected to network 198 and render content to user device 110 via other software such as web-browser. According to example embodiment, content providing software 112 stores user usage data (browsing information) and allows other application programming interface (API) software such as PFCR program 114 to access the user usage data and control or modify content providing software 112.

According to example embodiment, PFCR program 114 is a software program configured to control the content received from content providing service 142 by filtering and arranging it in accordance with the persistent list. The persistent list is associated with the user and can be applied in any content providing software and is not software specified. According to the embodiment, PFCR program 114, can be either integrated into content providing software 112 by utilizing the API, or a stand-alone program that filters any content received by content providing software 112. A PFCR program 114 receives a data stream, arranges and organizes its content by filtering with a user associated persistent list and transfers the output content to content providing software 112. A persistent list is a list of important items (objects) such as, for example, words, names, phrases or other parameters that are used to refine (filter) the content to adapt it to user preferred settings in accordance to the items and their order in the persistent list. According to an example embodiment, a persistent list is determined either by loading the items from user device 110 or server 140, or by determining the items from user profile (or user inputs), or combining both user profile and loaded persistent list. In other embodiments, user profile can be determined either from software usage history, such as fields or queries the user previously applied when the user used content providing software 112, or by requesting the user to enter the items the user prefers to use as a filter for the content. The operations and functions of PFCR program 114 are described in further details below with regard to FIG. 2.

Figure 2:
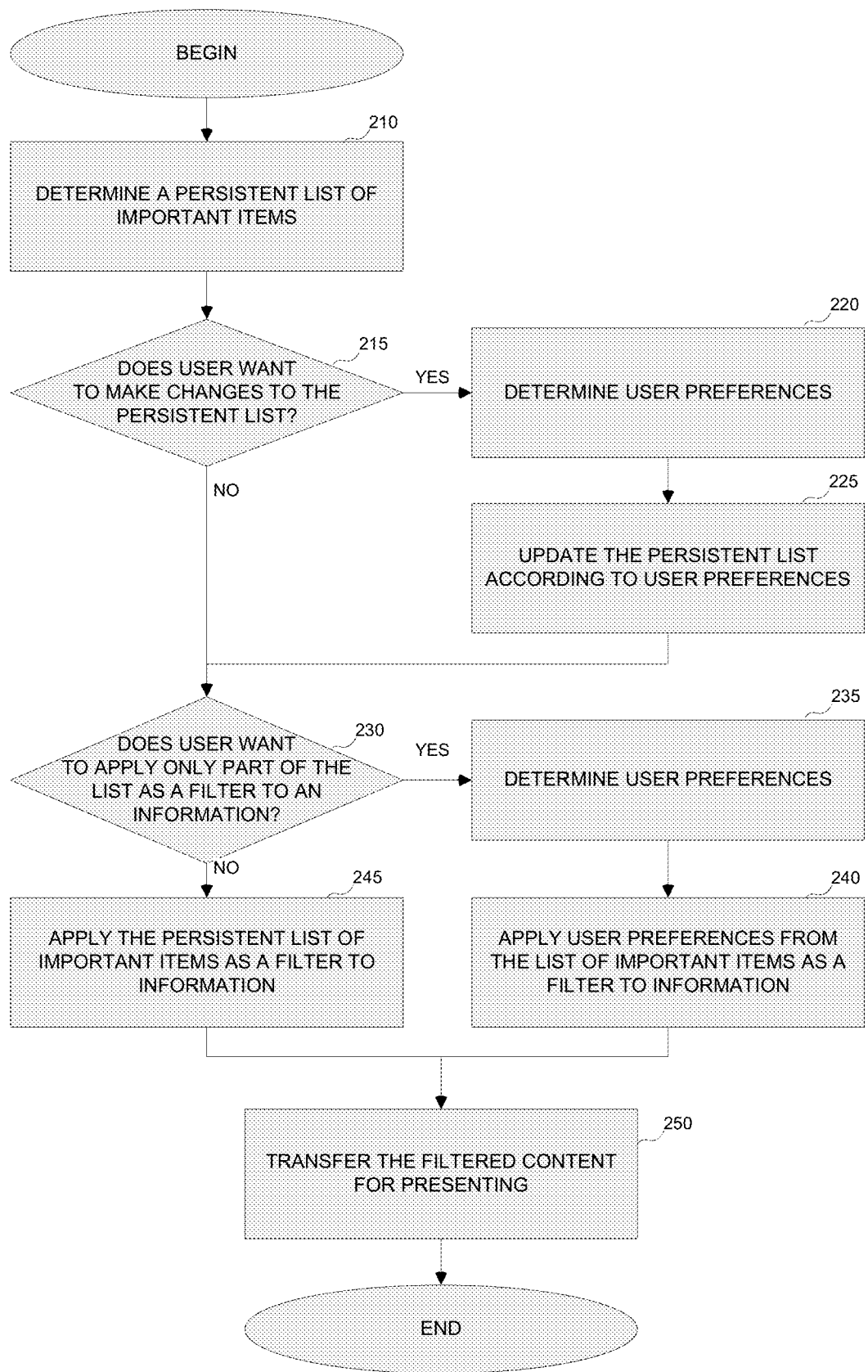
FIG. 2 is a flowchart illustrating operations of the Persistent Filter Content Refinement program of FIG. 1, in accordance with an embodiment of the invention.

FIG. 2 is a flowchart illustrating the operations of PFCR program 114, in accordance with an embodiment of the invention. A PFCR program 114 is a software program configured to manage the persistent filter list, filter the content according to items and their priority, and transfer the content to content providing software 112.

Referring to step 210, PFCR program 114 determines a persistent list of important items. The persistent list is a set of items specifically chosen for a particular user. The persistent list can be either loaded from the memory of user device 110, server 140, downloaded from the Internet or determined by PFCR program 114 either from a user usage history or user profile. According to example embodiment, the persistent list is initially determined from the user profile and user inputs and then stored on user device 110 or server 140, or another computing device connected via network 198, and managed by PFCR program 114. In another embodiment, the persistent list can be determined only from an analysis of the user usage history stored by content providing software 112. The persistent list items can be determined for example, by analyzing the user usage data such as words, names and phrases the user clicked on with a pointing device such as in a social media websites, news websites, or by determining what are the items or groups the user followed and adding these groups or items to the persistent list. In further embodiment, for example, persistent list can be either constructed or updated by applying a clickstream clustering algorithm or adopted User Behavior Analytics (UBA) method or Markov models that analyze the user usage behavior that can be transformed to items of the persistent list. In further embodiments, a user can create the persistent list by manually entering the items that can be stored as a part of the user profile either on user device 110, uploaded to server 140, or stored in the memory of any other computing device connected to network 198.

Referring to decision 215, PFCR program 114 presents a determined persistent list and checks whether the user wants to make changes or update the items on the persistent list. If the user wants to make changes to the persistent list (decision 215, "Yes" branch) PFCR program 114 proceeds to step 220. If the user does not want to change the persistent list (decision 215, "No" branch) PFCR program 114 proceeds to step 230.

Referring to step 220, PFCR program 114 determines user preferences by either determining them based on the user profile, user usage history or by letting the user input items to be added or removed from the persistent list. According to example embodiment, PFCR program 114 uploads a previously stored persistent list from a file/database and allows the user either to append it or completely substitute it with a new persistent list created in accordance to user profile or extracted from user usage history. In another embodiment, PFCR program 114 can suggest to the user to add items to the persistent list according to statistical analysis of the user profile or usage history, for example, by displaying as a drop down menu the most frequently used items the user applied as a filter or clicked or emphasized with a pointing device that are not included in existing persistent list. In further embodiments, the user can manually enter the items to persistent list by either typing them in, uploading items from other files, or by utilizing drag and drop technique to simply drag the items on a display to the visible persistent list window or icon.

Referring to step 225, PFCR program 114 updates the persistent list according to a user profile and user inputs. For example, the persistent list can be constructed as a binary tree and therefore some fields will be a subfield of a broader field. By creating a hierarchy such as binary tree, PFCR program 114 determines the priority of each item and the field where to place, and subsequently store, the additional items from the user profile in the persistent list. The hierarchy is used to present the content in accordance to items priority in the persistent list while the higher prioritized feeds will be displayed first.

Referring to decision 230, PFCR program 114 checks whether a user wants to apply only part of the persistent list as a filter. According to example embodiment, PFCR program 114 allows displays the persistent filter items to the user as a menu and allows to uncheck the items the user prefers to exclude from the filtering parameters. If the user chooses to apply only several items as a filter from the persistent list, or in other embodiments, the user profile items are different from the loaded persistent list items (decision 230, "Yes" branch) proceed to step 235. If the user wants to apply the persistent list as a filter without updating (decision 230, "no" branch) proceed to step 245.

Referring to step 235, PFCR program 114 determines what items from the persistent list the user wants to use to filter the content. According to an example embodiment, the user is presented with a persistent list where the user can either check or uncheck each item independently and therefore include or exclude the particular item from the filtering of the content. In other embodiments the user can delete the items he prefers to exclude. A PFCR program 114 creates a temporary persistent list with all the items that remain after user chooses the items.

Referring to step 240, PFCR program 114 applies a user chosen preferences from the persistent list as a filter to the content. According to an example embodiment, PFCR program 114 applies temporary persistent list as a filter to the content. The content can be filtered by, for example, applying a social data stream filtering algorithms or an algorithm for matching incoming data stream against stored continued queries (items), such as, BestFitTrie algorithm. For example, if the user picked up only one field "John Doe" from the persistent list, PFCR program 114 will search all the content and pick only the fields where "John Doe" is a part of the field. Afterwards, PFCR program 114 will arrange the remaining fields in order such as, for example, by moving the field where "John Doe" appears at the beginning of the content as the first field. In other embodiments, PFCR program 114 will arrange the fields after filtering by prioritizing where the first field will be the one that includes the item ("John Doe") more times than all the other fields. In other embodiment, PFCR program 114 determines the filtering query format of content providing software 112, translates the temporary persistent list to content providing software 112 filtering query and submits the filtering query to the content providing service 142. In other embodiment, PFCR program 114 can filter the content by transforming the temporary persistent list to a filtering query and submitting the filtering query to the content providing service 142 via network 198. PFCR program 114 can determine the filtering query format acceptable by content providing service 142 either by analyzing the content or by a specific predetermined list of filtering query formats for each corresponding content providing service that is stored on a user device 110 or accessible at a specific server via network 198.

Referring to step 245, PFCR program 114 applies the persistent list of important items as a filter to the content as described above in step 240. In other embodiment, PFCR program 114 determines the filtering query format of content providing software 112, translates the persistent list to content providing software 112 filtering query and submits the filtering query to the content providing service 142.

In further embodiment, after filtering the content will be reorganized according to the items order in the persistent list, either based on hierarchy of the item in the persistent list or number of appearances by the item in the field.

Referring to step 250, PFCR program 114 transfers the filtered content for presenting after the persistent list was applied to the initial content as a filter. After filtering the content PFCR program 114 organizes the fields of the outcome content according to priority and either transfers the content to providing software 112 for presenting or presenting the outcome content in a new field (such as window, screen or feed). For example, if the persistent filter is applied to the news feeds and includes only a word "Urgent" as an item, the outcome content would include only the fields that include an item "Urgent" in the content of the field and all the fields that include the "Urgent" item would be organized proportionally to the number of times the item appeared in each filed. The outcome content is arranged and presented according to the persistent list items hierarchy (first items has higher priority) or by frequency of items appearance in each field of the outcome content, or some combination of both hierarchy or frequency of appearance of the items.

Figure 3:
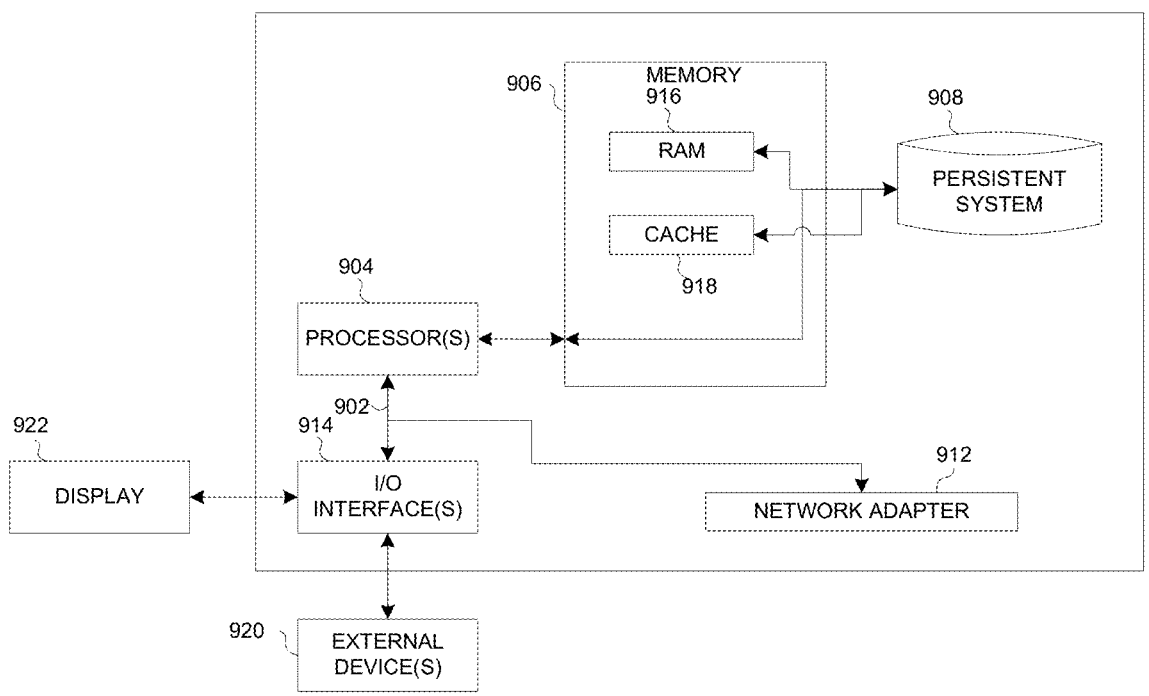
FIG. 3 is a block diagram depicting the hardware components of the Persistent Filter Content Refinement system of FIG. 1, in accordance with an embodiment of the invention.

FIG. 3 depicts a block diagram of components of user device 110 and server 140, in accordance with an illustrative embodiment of the present invention. It should be appreciated that FIG. 3 provides only an illustration of one implementation and does not imply any limitations with regard to the environments in which different embodiments can be implemented. Many modifications to the depicted environment can be made.

A user device 110 and a server 140 include communications fabric 902, which provides communications between computer processor(s) 904, memory 906, persistent storage 908, communications unit 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The PFCR 114 program is stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 908 can also be removable. For example, a removable hard drive can be used for persistent storage 908. Other examples include optical and magnetic disks, thumb drives, and smart cards that are inserted into a drive for transfer onto another computer-readable storage medium that is part of persistent storage 908.

Communications unit 912, in these examples, provides for communications with other data processing systems or devices. In these examples, communications unit 912 includes one or more network interface cards. Communications unit 912 can provide communications using one or both of physical and wireless communications links. The PFCR program 114 can be downloaded to persistent storage 908 through communications unit 912.

I/O interface(s) 914 allows for input and output of data with other devices that can be connected to user device 110 and server 140. For example, I/O interface 914 can provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., the PFCR program 114 can be stored on such portable computer-readable storage media and can be loaded onto persistent storage 908 via I/O interface(s) 914. I/O interface(s) 914 can also connect to a display 922.

Display 922 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method to display a filtered content, the method comprising:
   determining, by a computer, a filtering query based on a persistent list of items, wherein the persistent list of items comprises a list of natural language elements constructed as a binary tree with a hierarchy between one or more items by applying a clickstream clustering algorithm on a usage history, wherein the list of the natural language elements is a set of items determined from the usage history and preferences of the user to provide important content that the user prefers, and wherein the filtering query is a plurality of computer instructions corresponding to the one or more items from the set of items determined from the usage history and the preferences of the user;
   determining, by the computer, whether a server is capable of receiving the filtering query;
   based on determining that the server is capable of receiving the filtering query, transmitting, by the computer, the filtering query to the server;
   receiving, by the computer, filtered content from the server, wherein the filtered content is based on the filtering query;
   reorganizing the filtered content based on the hierarchy of each one of the items in the persistent list; and
   displaying, by the computer, the reorganized filtered content.

2. The method according to claim 1, further comprising:
   based on determining that the server is not capable of receiving the filtering query:
      receiving, by the computer, the input stream of content; and
      applying, by the computer, the filtering query to the input stream of content to receive the filtered content.

3. The method according to claim 1, further comprising arranging, by the computer, the filtered content based on a hierarchy contained in the persistent list of items.

4. The method according to claim 1, wherein submitting the filtering query to the source further comprises formatting, by the computer, the filtering query based on the server.

5. The method according to claim 1, wherein determining the filtering query based on a persistent list of items further comprises:
   determining, by the computer, a previous filtering query;
   analyzing, by the computer, the previous filtering query for a new item;
   displaying, by the computer, the new item;
   receiving, by the computer, a selection from a user;
   adding, by the computer, the new item to the persistent list of items based on the selection;
   storing, by the computer, the persistent list of items; and
   adding, by the computer, the new item to the filtering query.

6. The method according to claim 1, wherein transmitting the filtering query to the server further comprises:
   determining, by the computer, a query format based on the server; and
   formatting, by the computer, the filtering query to comply with the server.

7. The method according to claim 1, wherein determining a stream of content further comprises:
   determining, by the computer, a memory address to the stream of content;
   determining, by the computer, a format of the stream of content located at the memory address; and
   restructuring, by the computer, the filtering query based on the format of the stream of content.

8. A computer program product for displaying a filtered content, the computer program product comprising:
   one or more computer-readable storage devices and program instructions stored on at least one of the one or more tangible storage devices, the program instructions comprising:
      program instructions to determine, by a computer, a filtering query based on a persistent list of items, wherein the persistent list of items comprises a list of natural language elements constructed as a binary tree with a hierarchy between one or more items by applying a clickstream clustering algorithm on a usage history, wherein the list of the natural language elements is a set of items determined from the usage history and preferences of the user to provide important content that the user prefers, and wherein the filtering query is a plurality of computer instructions corresponding to one or more items from the set of items determined from the usage history and the preferences of the user;
      program instructions to determine, by the computer, whether a server is capable of receiving the filtering query;
      based on determining that the server is capable of receiving the filtering query, program instructions to transmit, by the computer, the filtering query to the server;
      program instructions to receive, by the computer, filtered content from the server, wherein the filtered content is based on the filtering query;

program instructions to reorganize the filtered content based on the hierarchy of each one of the items in the persistent list; and program instructions to display, by the computer, the reorganized filtered content.

9. The computer program product of claim 8, further comprising:
based on determining that the server is not capable of receiving the filtering query:
program instructions to receive, by the computer, the input stream of content; and
program instructions to apply, by the computer, the filtering query to the input stream of content to receive the filtered content.

10. The computer program product of claim 8, further comprising program instructions to arrange, by the computer, the filtered content based on a hierarchy contained in the persistent list of items.

11. The computer program product of claim 8, wherein program instructions to submit the filtering query to the source further comprises program instructions to format, by the computer, the filtering query based on the server.

12. The computer program product of claim 8, wherein program instructions to determine the filtering query based on a persistent list of items further comprises:
program instructions to determine, by the computer, a previous filtering query;
program instructions to analyze, by the computer, the previous filtering query for a new item;
program instructions to display, by the computer, the new item;
program instructions to receive, by the computer, a selection from a user;
program instructions to add, by the computer, the new item to the persistent list of items based on the selection;
program instructions to store, by the computer, the persistent list of items; and
program instructions to add, by the computer, the new item to the filtering query.

13. The computer program product of claim 8, wherein program instructions to transmit the filtering query to the server further comprises:
program instructions to determine, by the computer, a query format based on the server; and
program instructions to format, by the computer, the filtering query to comply with the server.

14. The computer program product of claim 8, wherein program instructions to determine a stream of content further comprises:
program instructions to determine, by the computer, a memory address to the stream of content;
program instructions to determine, by the computer, a format of the stream of content located at the memory address; and
program instructions to restructure, by the computer, the filtering query based on the format of the stream of content.

15. A computer system for displaying a filtered content, the computer system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instructions to determine, by a computer, a filtering query based on a persistent list of items, wherein the persistent list of items comprises a list of natural language elements constructed as a binary tree with a hierarchy between one or more items by applying a clickstream clustering algorithm on a usage history, wherein the list of the natural language elements is a set of items determined from the usage history and preferences of the user to provide important content that the user prefers, and wherein the filtering query is a plurality of computer instructions corresponding to one or more items from the set of items determined from the usage history and the preferences of the user;
program instructions to determine, by the computer, whether a server is capable of receiving the filtering query;
based on determining that the server is capable of receiving the filtering query, program instructions to transmit, by the computer, the filtering query to the server;
program instructions to receive, by the computer, filtered content from the server, wherein the filtered content is based on the filtering query;
program instructions to reorganize the filtered content based on the hierarchy of each one of the items in the persistent list; and
program instructions to display, by the computer, the reorganized filtered content.

16. The computer system of claim 15, further comprising:
based on determining that the server is not capable of receiving the filtering query:
program instructions to receive, by the computer, the input stream of content; and
program instructions to apply, by the computer, the filtering query to the input stream of content to receive the filtered content.

17. The computer system of claim 15, further comprising program instructions to arrange, by the computer, the filtered content based on a hierarchy contained in the persistent list of items.

18. The computer system of claim 15, wherein program instructions to submit the filtering query to the source further comprises program instructions to format, by the computer, the filtering query based on the server.

19. The computer system of claim 15, wherein program instructions to determine the filtering query based on a persistent list of items further comprises:
program instructions to determine, by the computer, a previous filtering query;
program instructions to analyze, by the computer, the previous filtering query for a new item;
program instructions to display, by the computer, the new item;
program instructions to receive, by the computer, a selection from a user;
program instructions to add, by the computer, the new item to the persistent list of items based on the selection;
program instructions to store, by the computer, the persistent list of items; and
program instructions to add, by the computer, the new item to the filtering query.

20. The computer system of claim 15, wherein program instructions to transmit the filtering query to the server further comprises:

program instructions to determine, by the computer, a query format based on the server; and program instructions to format, by the computer, the filtering query to comply with the server.

\* \* \* \* \*